3,143,516
POLYMERIZABLE COMPOSITION COMPRISING UNSATURATED CELLULOSE ETHER AND PROCESS OF PREPARING SAME
Wolfgang Klendauer, Wiesbaden, and Julius Voss, Wiesbaden-Biebrich, Germany, assignors to Kalle Aktiengesellschaft, Wiesbaden-Biebrich, Germany, a corporation of Germany
No Drawing. Filed Mar. 21, 1961, Ser. No. 97,173
Claims priority, application Germany Mar. 26, 1960
14 Claims. (Cl. 260—17)

This invention relates to mixtures of polymerisable carbohydrate ethers, which mixtures contain a catalyst for polymerisation incorporated in a particular form.

Unsaturated carbohydrate ethers, for example allyl cellulose, have already been polymerised in solution by the addition of suitable catalysts.

It would be of interest to produce a product in which the polymerisable carbohydrate ether was already admixed with the polymerisation catalyst, so that solutions could be produced therefrom after varying periods of time with constant polymerisation properties. Attempts to admix the catalyst in the necessary quantity with the dry carbohydrate ethers resulted in mixtures most of which had an unsatisfactory stability on storage. They lose their polymerisation capacity and/or their solubility in a relatively short time.

The present invention relates carbohydrate ether mixtures suitable for the production of polymerisable solutions, said mixtures including at least one unsaturated polymerisable carbohydrate ether and at least one non-polymerisable high molecular substance, which carries the polymerisation catalyst and which is soluble, at least partly, in the same solvent as the unsaturated polymerisable carbohydrate ether.

As polymerisable carbohydrate ethers according to the present invention, such are concerned in which a proportion of the hydroxyl groups present in the carbohydrate molecule are etherified by at least one unsaturated polymerisable radical such as crotyl, styryl, chlorostyryl, bromostyryl and, in particular, allyl. Such carbohydrate ethers are also concerned as contain in addition to these unsaturated ether groups one or more other ether groups such as those containing alkyl, hydroxylalkyl, carboxymethyl or ethane sulphonic acid groups. Carbohydrate ethers containing unsaturated radicals are known in the art. They are described, e.g., in U.S. patent specifications Nos. 2,891,056, 2,406,369, and 2,635,099.

As preferred polymerisable carbohydrate ethers are concerned the allyl ethers of cellulose, of starch, of amylose and of amylopectin, and also the carboxymethyl-allyl ethers of these carbohydrates and their salts, advantageously the alkali metal salts, and the hydroxyalkyl-allyl ethers of cellulose, starch, amylose and amylopectin and also the corresponding unsaturated ethers of carob bean flour.

The specified carbohydrate ethers are soluble in water or in organic solvents depending on the degree and nature of the substitution.

In this case it can be stated quite generally that a relatively low degree of substitution leads to water soluble products. With a higher degree of substitution, a range is reached in which the products exhibit decreasing water solubility and with a still higher degree of substitution products arise which are insoluble in water and soluble in organic solvents. A total range of substitution from about 0.5 to about 2.0 per glucose unit yields in most cases more or less water soluble products, while with a further increasing degree of substitution the products become increasingly soluble in organic solvents.

With the polymerisable carbohydrate ethers are mixed in a quantity which depends upon the desired speed of polymerisation and the specific activity of the polymerisation catalyst used, one or more non-polymerisable higher molecular substanecs which carry the polymerisation catalyst or catalysts and which are at least partly soluble in the same solvent as the unsaturated carbohydrate ether. For 100 parts by weight of polymerisable carbohydrate ether about 1 to about 50, preferably about 5 to about 15 parts by weight of non-polymerisable high molecular substance carrying the catalyst are incorporated.

As non-polymerisable higher molecular substances water-soluble higher molecular carbohydrates and their water-soluble derivatives, in particular their esters and ethers, are concerned, e.g., starch ethers, for example carboxymethyl starch, methyl starch, and hydroxy ethyl starch; cellulose ethers, such as methyl, hydroxyethyl or carboxymethyl ethers, dextrane, dextrine, alginic acid, pectines, water-soluble starches, tragancanth, carob bean flour, water-soluble synthetic polymerisation products, such as polyvinyl alcohol, higher molecular solid polyethylene glycols, water-soluble salts of polyacrylic acid and other higher molecular water-soluble substances, such as gelatine, in the case in which the unsaturated carbohydrate ethers are water-soluble. Preference is given to the non-polymerisable derivatives of carbohydrates, such as cellulose and starch, which are soluble in water. When the unsaturated carbohydrate ethers are soluble in organic solvents, such higher molecular, non-polymerisable substances are used as are likewise soluble in organic solvents, for example organic solvent soluble higher molecular carbohydrates and their organic solvent soluble derivatives, in particular their esters and ethers, such as cellulose ethers, e.g., ethyl cellulose, benzyl cellulose, acetyl butyryl cellulose, or acetyl celluloses, nitro-celluloses, organic solvent soluble starch ethers, such as starch ethyl ether, acetyl starch, nitro starch, or other higher molecular, non-polymerisable products of good solubility in solvents, such as polyvinyl acetate, polyvinyl acetal and other synthetic plastics of good solubility properties. Preference is given to the non-polymerisable derivatives of carbohydrates, such as cellulose and starch, which are soluble in organic solvents.

As polymerisation catalysts are suitable organic and inorganic per-compounds and per-oxides, if desired in admixture with a reducing agent as redox-catalyst system, substances, causing light polymerisation, e.g., diazo or azido compounds, or also azo compounds and other radical formers, e.g., benzoyl peroxide, di-tert.-butyl peroxide, or azo-diiso-butyric acid dinitrile. Particularly suitable is potassium persulphate, percarbamide, the redox system sodium sulphite/potassium persulphate, and cyclohexanone peroxide.

For the incorporation of the catalysts in the high molecular, non-polymerisable carrier substance, the latter is mixed or kneaded with a solution of the catalyst and the mixture then dried and, if desired, ground. The catalyst can also be incorporated dry or dissolved in the moist carrier mass, as it ocurs, for example, in manufacture. When a catalyst consists of several constituents, as in the case of redox catalysts, advantageously each of the catalyst components is separately incorporated in a carrier substance followed by drying, whereupon the two constituents thus incorporated are mixed together and with the unsaturated carbohydrate ether. For 1 part of catalyst there are usually used about 1 to about 20 parts, preferably 5 to 10 parts, of the carrier substance.

By the use of catalysts incorporated in a carrier substance, direct contact between the catalyst and the polymerisable carbohydrate ether is reduced to a large extent. In this way premature polymerisation of the unsaturated carbohydrate ether is practically avoided. By selecting for the carrier substance one which is related in structure to the polymerisable carbohydrate ether, it is easily possible to convert the components of the mixture into a similar form so that during shaking, such as may occur in transport, no segregation of the constituents takes place such as would be the case, for example, if a crystalline catalyst were mixed directly with a cellulose ether which is granulated or in flocks. It has been found that the additions of high molecular, non-polymerisable carrier substances in relatively small quantities causes no noteworthy increase of the swelling capacity of the polymerised products, so that for 10 parts by weight of polymerisable carbohydrate ether 0.5 to 1.5 parts by weight of a mixture of high molecular non-polymerisable carrier substance with catalyst can be used.

With the suitable solvents the stable mixtures of polymerisable carbohydrate ethers of this invention can be converted into viscous solutions which after some time solidify to a gel or after pouring out into thin layers and drying are converted into a water insoluble film.

The following examples illustrate the invention:

Example 1

To 90 parts by weight of a water soluble methyl cellulose having a content of 29% of methoxyl groups, in a kneading machine, 10 parts by weight of finely powdered potassium persulphate, suspended in 120 parts of water, at 20° C. are added, following by kneading the mixture, breaking up, drying and grinding. 10 parts by weight of the catalyst mixture produced are then mixed with 100 parts by weight of similarly formed allyl carboxymethyl cellulose containing per glucose unit 0.39 mol of carboxymethyl group and 0.66 mol of allyl groups. This mixture, even after three months storage, gives a clear aqueous solution which on drying leaves a water insoluble but still water swellable film of which the swellability in the course of time is continuously reduced.

Example 2

A mixture of 45 parts by weight each of a methyl cellulose soluble to give a solution of low viscosity, and of carboxymethyl cellulose, is kneaded in a kneading machine with a solution of 15 parts by weight of percarbamide and 90 parts of water. The resulting mass is broken up, dried, ground and sieved. With 100 parts by weight of a hydroxy-ethyl-allyl cellulose with a content per glucose unit of 1.4 mol of hydroxyethyl groups and 0.35 mol of allyl groups, are mixed 15 parts by weight of the resulting catalyst product. The mixture produced is stable for several months at least and gives when dissolved in water clear solutions which on drying out polymerise; thereby forming insoluble films.

Example 3

A mixture consisting of 45 parts by weight of a water-soluble methyl starch and 45 parts by weight of carboxy methyl starch is mixed in a mixer with 10 parts by weight of potassium persulfate, and the homogeneous mixture thus obtained is then kneaded in a kneading machine with 50 parts by weight of 90 percent methanol. The resulting mass is then dried, coarsely ground, and finally sieved. 10 parts by weight of the catalyst product so obtained are added to 100 parts by weight of a carboxy methyl allyl starch having a content per glucose unit of 0.55 mol of carboxy methyl groups and 0.58 mol of allyl groups. The resulting mixture is stable and undergoes practically no change for at least several months and, after this period, gives a clear solution when dissolved in water. Upon drying, the solution polymerizes and becomes insoluble. In this way, water-insoluble films may be obtained.

Example 4

10 parts by weight of finely pulverized potassium persulfate suspended in 120 parts by volume of water are added, in a kneading machine, to a mixture of 45 parts by weight of carboxy methyl cellulose and 45 parts by weight of a methyl cellulose which, when dissolved, yields a solution of low viscosity. The resulting mixture is kneaded at 20° C., dried, and then screened. Subsequently, 10 parts by weight of the cataly mixture thus obtained are mixed with 100 parts by weight of a carboxy methyl allyl starch which, per glucose unit, contains 0.55 mol of carboxy methyl groups and 0.58 mol of allyl groups. After being stored for more than three months, the mixture, when dissolved in water, yields a clear solution. This solution may be used for casting films, or for painting purposes, a water-insoluble film being produced on drying, the swellability of which decreases in the course of time.

The carboxy methyl allyl starch used in the present example is prepared as follows:

50 parts by weight of a carboxy methyl starch prepared in known manner (DS 0.55) are agitated for one hour with a solution consisting of 200 parts by volume of propanol and 8 parts by weight of solid sodium hydroxide, dissolved in 19 parts by volume of water. Subsequently, the reaction mixture is filtrated by suction. In a flask provided with a reflux cooler, the residue is then agitated for two hours and at a temperature of 60° C. with 60 parts by weight of allyl bromide, and again filtered. In order to remove any allyl bromide which may have evaded reaction, the crude reaction product thus obtained is finally washed with acetone.

By repeated treatment with pure methanol, the salts formed during the reaction process are removed. In this way, a carboxy methyl allyl starch is obtained which contains 0.58 mol of allyl groups per glucose unit.

Example 5

10 parts by weight of finely pulverized potassium persulfate suspended in 120 parts by volume of water are mixed in a kneading machine with a mixture made up of 45 parts by weight of carboxy methyl cellulose and 45 parts by weight of methyl cellulose which, when dissolved, yields a solution of low viscosity. The mass is then kneaded, dried and screened. 10 parts by weight of the catalyst mixture so obtained are mixed with 100 parts by weight of a carboxy methyl allyl amylose containing 0.5 mol of carboxy methyl groups and 0.5 mol of allyl groups per glucose unit. Even after a storage of several months, the mixture yields clear aqueous solutions which upon drying form a water-insoluble film the swellability of which decreases in the course of time.

The carboxy methyl allyl amylose used in the present example is prepared in analogy to the preparation of the carboxy methyl allyl starch described in Example 4. It has a DS of allyl groups of 0.5 mol per glucose unit.

What is claimed is:

1. Carbohydrate ether mixtures suitable for the production of polymerisable solutions which mixtures comprise at least one unsaturated polymerisable carbohydrate ether and at least one non-polymerisable high molecular substance acting as carrier for at least one polymerisation catalyst and being soluble, at least partly, in the same solvent as the unsaturated polymerisable carbohydrate ether.

2. Carbohydrate ether mixtures according to claim 1 which contain unsaturated polymerisable carbohydrate ether and catalyst-carrying non-polymerisable high molecular substance in substantially the same particle size and form.

3. Carbohydrate ether mixtures according to claim 1, containing on 100 parts by weight of polymerisable carbohydrate ether 5 to 15 parts by weight of catalyst-carrying non-polymerisable high molecular substance.

4. Carbohydrate ether mixtures as claimed in claim 1, in which the catalyst-carrying non-polymerisable high molecular substance contains on 1 part of catalyst from 5 to 10 parts of carrier substance.

5. The method of making carbohydrate ether mixtures according to claim 1 which comprises incorporating at least one catalyst in a non-polymerisable high molecular substance and mixing the catalyst containing material thus produced, in a dry state, with at least one unsaturated polymerisable carbohydrate ether.

6. A carbohydrate ether mixture according to claim 1 in which the unsaturated polymerizable carbohydrate ether is an allyl carboxymethyl cellulose.

7. A carbohydrate ether mixture according to claim 1 in which the unsaturated polymerizable carbohydrate ether is a hydroxy-ethyl-allyl cellulose.

8. A carbohydrate ether mixture according to claim 1 in which the unsaturated polymerizable carbohydrate ether is a carboxy methyl allyl starch.

9. A carbohydrate ether mixture according to claim 1 in which the unsaturated polymerizable carbohydrate ether is a carboxy methyl allyl amylose.

10. A carbohydrate ether mixture according to claim 1 in which the catalyst carrier is a water soluble methyl cellulose.

11. A carbohydrate ether mixture according to claim 1 in which the catalyst carrier is a water soluble methyl starch.

12. A carbohydrate ether mixture according to claim 1 in which the catalyst carrier is carboxy methyl cellulose.

13. A carbohydrate ether mixture according to claim 1 in which the catalyst is potassium persulfate.

14. A carbohydrate ether mixture according to claim 1 in which the catalyst is percarbamide.

References Cited in the file of this patent

UNITED STATES PATENTS

| | | |
|---|---|---|
| 2,492,203 | Treadway | Dec. 27, 1949 |
| 2,585,035 | Roach et al. | Feb. 12, 1952 |
| 2,623,864 | Wrigley et al. | Dec. 30, 1952 |
| 2,891,056 | Wagner | June 16, 1959 |

FOREIGN PATENTS

| | | |
|---|---|---|
| 583,471 | Great Britain | Dec. 19, 1946 |